Patented Nov. 9, 1943

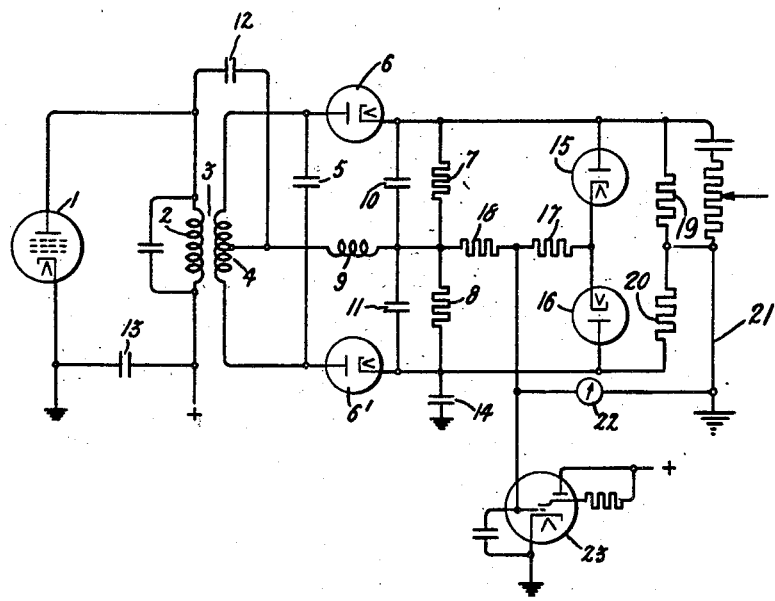

2,333,990

UNITED STATES PATENT OFFICE 2,333,990

TUNING INDICATION SYSTEM

Robert B. Dome, Bridgeport, Conn., assignor to General Electric Company, a corporation of New York.

Application February 12, 1941, Serial No. 378,627

12 Claims. (Cl. 250—40)

My invention relates to tuning indication means and particularly to such means for use in frequency modulation receivers.

Commonly in frequency modulation receivers a detector is employed having a balanced output circuit across which the voltage is zero when the receiver is properly tuned to an incoming wave, and having voltages on its opposite sides which vary oppositely in intensity with variation in tuning from the condition of resonance with the received wave. Thus, as the receiver tuning is varied through resonance the voltage across the output of the detector varies through a minimum value while that on either side of the output circuit varies continuously from a higher value to a lower value or conversely.

It is desired to provide in a tuning system for such receivers an indication, as by a deflection voltmeter, cathode ray device, or other suitable indication instrument, in which the indicating deflection is maximum when the receiver is in resonance.

An object of my invention is to provide means associated with the usual frequency modulation detector to produce a voltage which is maximum when the receiver is in resonance and which may be used to control such an indicating instrument.

A further object of my invention is to provide simple and inexpensive means for this purpose which may be applied to the usual frequency modulation receiver without undue complication thereof.

A further object of my invention is to provide not only that a maximum voltage be produced at resonance, but that the voltage have this maximum only at the resonant frequency and fall off essentially uniformly and symmetrically for frequencies either side of the resonant frequency so as to render a clear indication for proper tuning.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which the single figure represents an embodiment of my invention.

Referring to the drawing, I have represented at 1 an electron discharge device which may be utilized, for example, as the last intermediate frequency amplifier of a frequency modulation receiver. The output of this amplifier is tuned by means of a tuned circuit 2 tuned to the frequency of the intermediate frequency oscillations of the receiver. This tuned circuit includes the primary winding of a transformer 3, the secondary winding 4 of which is likewise tuned by means of a condenser 5 to the intermediate frequency. Opposite terminals of the secondary winding 4 are connected to the respective anodes of a pair of electron discharge devices 6 and 6', the cathodes of which are connected together through resistances 7 and 8. The point intermediate the two resistances 7 and 8 is connected through a choke coil 9 to the intermediate point on the secondary winding 4 and these resistances 7 and 8 are each by-passed by condensers 10 and 11 respectively for oscillations of the intermediate frequency.

A condenser 12 is connected between the anode of discharge device 1 and the midpoint of the secondary winding of the transformer 3. A by-pass condenser 13 is connected between the cathode of the amplifier 1 and the low potential terminal of the primary winding of the transformer 3, this condenser being the usual by-pass condenser for the source of anode operating voltage of the discharge device 1. Similarly the cathode of diode 6 is connected to ground through a condenser 14.

As thus connected the circuit of the transformer 3 and discharge devices 6 and 6' constitute the now well known frequency modulation detector circuit. In such circuits, since the primary and secondary winding of the transformer are tuned to the intermediate frequency the voltage across the secondary winding is shifted in phase by 90° with respect to the voltage across the primary winding. By reason of condenser 12 the voltage on the primary winding is connected in series with the voltage on half of the secondary winding in the circuit of each respective diode 6 and 6'. Thus the diode 6 has supplied thereto the voltage of the primary winding of transformer 3 plus the voltage of the upper half of the secondary winding of the transformer 3, the circuit extending from ground through condenser 13, primary winding of transformer 3, condenser 12, upper half of secondary winding of transformer 3, diode 6 and condensers 10, 11 and 14. Similarly the circuit of the diode 6' extends from ground through condenser 13, primary winding of transformer 3, condenser 12, lower half of secondary winding of transformer 3, diode 6' and condenser 14.

Since the voltage on the secondary winding is displaced in phase by 90° from the voltage on the primary when the oscillations supplied to the transformer have a frequency exactly equal to the frequency to which the primary and secondary winding of the transformer are tuned, the voltages supplied to the diodes 6 and 6' are equal at that time and thus the rectified voltages appearing on resistances 7 and 8 are equal. This condition exists, however, only when the oscillations are of the correct frequency. If the frequency deviates from that frequency the voltage on the secondary winding deviates from the 90° relation and thus the two voltages applied to one of the diodes becomes in more nearly aiding relation, whereas the two voltages applied to the opposite diode become in more nearly opposed relation and thus the unidirectional voltages on one of the two resistances 7 and 8 increases while that on the other decreases by an amount dependent upon the extent of deviation in frequency of the oscillations from the frequency to which the circuits are tuned.

In accordance with my invention it is desired to utilize these two voltages to produce an indication of the condition of tuning of the receiver. If the receiver be one of the superheterodyne type tunable to a number of fixed frequencies the oscillations supplied to the circuit 2 varies through the frequency to which the transformer 3 is tuned as the tuning of the receiver changes through any of the fixed frequencies which are received and the voltages on resistances 7 and 8 vary differentially with the variations in frequency and are equal when the frequency equals the frequency to which the circuit 2 is tuned. It is desired to produce from these two voltages on resistances 7 and 8 a voltage which has a maximum value when the receiver is properly tuned. In this way, if the tuning instrument be a deflection instrument, for example, such as an ordinary voltmeter with a deflecting index member, the maximum deflection occurs when the receiver is properly tuned. Similarly, if the instrument be one of the cathode ray type, the maximum change in luminescence occurs when the receiver is properly tuned.

To this end, in accordance with my invention, a pair of diodes 15 and 16 are employed having their anodes connected respectively to the opposite sides of the balanced circuit across which resistances 7 and 8 are connected and having their cathodes connected together and through resistances 17 and 18 to the point between resistances 7 and 8. Also connected across the balanced circuit are a pair of resistances 19 and 20 having the point therebetween connected to ground as indicated at 21. The tuning indicating instrument, which may be that indicated at 22, may then be connected between ground, as at the point 21, and the point between resistances 17 and 18. The meter 22 may be any suitable voltmeter of high impedance producing a deflection proportional to the voltage applied thereto. If desired the indication may be produced by a cathode ray device which I have conventionally indicated at 23 and which may be one which is commonly used in radio receivers and which is commonly spoken of as the "magic eye."

As thus described, my invention operates as follows: When the receiver is properly tuned the voltages on resistances 7 and 8 are equal and are of such polarity that diodes 15 and 16 are both conducting and accordingly the sum of the voltages on resistances 17 and 18 is equal to the voltages on the individual resistances 7 and 8. Since the voltages on resistances 7 and 8 are equal and of opposite polarity, there is no voltage across resistances 19 and 20 and hence since resistances 17 and 18 are equal, the voltage across the instrument 22 is equal to half of the voltage across resistance 8.

Let us assume now that the voltage supplied to the circuit has a frequency such that the potential of the resistance 7 increases and that of resistance 8 decreases. Diode 15 then becomes conducting passing current through resistances 17 and 18 of such polarity that the cathode of diode 16 becomes positive with respect to its anode and thus this diode becomes non-conducting. The potential on resistances 17 and 18 is then equal to the potential across resistance 7, half of this potential, of course, appearing on resistance 18. The difference between the two potentials 7 and 8 appears across resistances 19 and 20. Since these two resistances are equal half of this difference appears on resistance 20. The sum of the voltages on resistances 20, 8, and 18 appears upon indicating device 22 and will again be found to be half of the potential of the resistance 8 which now is smaller than the previous value.

The same operation occurs if the shift in frequency of the impressed oscillations is in such a direction that the potential on resistance 8 increases, while that on resistance 7 decreases, but with resistances proportioned as above described the potential on indicating devices 22 and 23 will always be equal to half of the smaller of the two voltages on resistances 7 and 8.

This may readily be understood from the following simple calculation.

If X represents the voltage across resistance 8 when the receiver is in tune, and D the variation in this voltage produced by deviation of frequency of the impressed oscillations from the resonant frequency of the discriminator, then, for any impressed frequency, the voltage on resistance 18 is $$\frac{X+D}{2}$$

that on resistance 8 is $X \pm D$; and that on resistance 20 is D. Adding these three voltages algebraically the voltage E applied to instrument 22 may be stated as follows:

$$E = \pm D - (X \pm D) + \left(\frac{X+D}{2}\right)$$

If the frequency deviation is such that the voltage on resistance 7 increases and that on 8 decreases we take the minus signs, and write $$E = -D - X + D + \left(\frac{X+D}{2}\right)$$

$$2E = -2X + X + D$$

$$-E = \frac{X-D}{2}$$

The same result occurs when the deviation is such that the voltage on resistance 8 is the larger.

Thus the voltage E is always negative with respect to ground and equal to half of the smaller of the two voltages on resistances 7 and 8. Of course, other proportioning of the different resistances may be employed if desired.

While I have described my invention in relation to a particular embodiment thereof, it will of course be understood that I do not wish to be limited thereto since many modifications both in the circuit arrangement and in the instrumentalities employed may be made without departing from the spirit and scope of my invention and I contemplate by the appended claims to cover any such modifications as fall within the true spirit and scope of my invention.

What I claim as new and desire to secure by Letters Patent of the United States is:

1. The combination, in a radio receiver, of a tuned circuit in which oscillations are received varying in frequency with variations in tuning of said receiver, means to produce two unidirectional voltages of opposite polarity having equal intensities when the frequency of said oscillations is equal to the resonance frequency of said circuit and which vary in intensity differentially with variations in the frequency of said oscillations, means to produce from said two voltages a second voltage having the same polarity for all frequencies of oscillations supplied to said tuned circuit and having maximum intensity when said oscillations have a frequency equal to said resonance frequency, said last means including means to reduce the intensity of said second voltage in response to and in accordance with the differential variation of said two voltages as the frequency of said oscillations departs from the resonance frequency of said circuit, and means responsive to said last voltage to indicate the condition of tuning of said receiver.

2. In combination, a tuned circuit, means to supply oscillations to said circuit having a frequency varying over a range extending on either side of the resonance frequency of said circuit, means to produce two voltages equal when the frequency of said oscillations equals the frequency to which said circuit is tuned and varying differentially with respect to variations in frequency of said oscillations from said resonance frequency, means responsive to said two voltages to produce a second voltage having maximum intensity when said voltages are equal, and indicating means responsive to said last voltage.

3. In combination, means to produce two voltages varying differentially with respect to variations in a primary variable, means to produce a voltage varying in selective response to that one of said two voltages which increases, means to produce a voltage varying with the difference in said two voltages, and means to combine said last two voltages and one of the first two voltages to produce a resultant voltage having maximum intensity when said first two voltages are equal.

4. In combination, means to produce two voltages of equal intensity and opposite polarity and varying equally and oppositely from said equal value in response to variations in a primary variable, means to produce a voltage of fixed polarity varying in selective response to that one of said two voltages which increases, means to produce a second voltage having polarity dependent upon which of said first two voltages is the larger and varying in intensity with the difference in said voltages, and means to combine said last two voltages and one of the former to produce a resultant voltage having maximum intensity when said first mentioned two voltages are equal.

5. In combination, a frequency modulation detector having a balanced output circuit, the voltage on one side of said circuit varying equally and oppositely with respect to that of the other in response to the frequency of voltage supplied to said circuit, means selectively responsive to the voltage on that side of said output circuit where the voltage increases to produce a third voltage varying directly with said increasing voltage, means to produce a fourth voltage, and means to combine said third voltage with said fourth voltage to produce a resultant voltage having maximum intensity when the voltage across said balanced output circuit is zero.

6. In combination, a frequency modulation detector having a balanced output circuit, the unidirectional voltage on one side of said circuit varying equally and oppositely with respect to the unidirectional voltage on the other side of said circuit in response to variations in the frequency of voltage supplied to said circuit, a pair of diodes, the cathodes of said diodes being connected through a resistance common to said diodes to an intermediate point on said circuit and the anodes being connected to points on said circuit opposite said intermediate point, and indicating means responsive to voltage on said resistance to produce an indication in accordance with the frequency of oscillations supplied to said detector.

7. In combination, a frequency modulation detector having a balanced output circuit, the unidirectional voltage on one side of said circuit varying equally and oppositely with respect to that on the other in response to the frequency of voltage supplied to said circuit, a resistance connected across said circuit, a pair of diodes, the cathodes of said diodes being connected through a resistance common to said diodes to an intermediate point on said circuit and the anodes being connected to opposite sides of said circuit, and indicating means responsive to voltage between points on said two resistances.

8. In combination, means to produce two voltages of opposite polarity varying oppositely in intensity in response to variations in a primary variable, a pair of unilateral conducting devices having a resistance in series therewith and common thereto, and means responsive to change in said two voltages to render one or the other of said unilateral conducting devices conducting dependent upon which of the two voltages increases, said unilateral conducting devices being poled to pass current in the same direction through said common resistance thereby to produce a voltage of the same polarity on said common resistance irrespective of the direction of said variations of said primary variable.

9. In combination, means to produce two voltages of opposite polarity varying oppositely in intensity in response to variations in a primary variable, a pair of unilateral conducting devices having a resistance in series therewith and common thereto, means to apply each of said voltages through a corresponding one of said pair of unilateral conducting devices to said common resistance, said unilateral conducting devices being poled to pass current in the same direction through said common resistance, whereby voltage produced on said resistance varies with that one of said two voltages which increases and renders the other unilateral conducting device non-conducting and is of the same polarity irrespective of the direction of said variation in said primary variable.

10. In combination, means to produce two voltages of opposite polarity varying oppositely in intensity in response to variations in a primary variable, means to produce a third voltage varying in response to the difference in said voltages, an indicating device and means to apply said third voltage and a voltage varying as one of said first two voltages to said indicating device, said indicating device including means to produce maximum indication when said third voltage is minimum.

11. In combination, means to produce two voltages varying differentially with respect to variations of a common variable, means to produce a third voltage varying in accordance with the difference in said first two voltages whereby said third voltage is zero when said two voltages are equal and increased when one of said first two voltages increases and the other decreases as the difference in said two voltages increases, and means responsive to the relation between said third voltage and one of said first two voltages to produce a varying effect which is maximum when said first two voltages are equal.

12. In combination, a frequency discriminator network arranged to receive a frequency modulated carrier wave, said network including rectifier means having a balanced output circuit, means for deriving from said output circuit two voltages one which varies as the voltage on one side of said balanced output circuit and one which varies as the total voltage across said output circuit, and means controlled by said voltages to produce an effect which is maximum when the voltages on two sides of said balanced circuit are equal.

ROBERT B. DOME.